United States Patent
Yang et al.

(10) Patent No.: US 6,323,919 B1
(45) Date of Patent: Nov. 27, 2001

(54) REFLECTION TYPE DISPLAY WITH FRONT LIGHT

(75) Inventors: Ying Bao Yang, Kanagawa; Osamu Ishige, Tokyo; Yoji Oki, Kanagawa, all of (JP)

(73) Assignees: Sony Corporation; Stanley Electric Co., Ltd., both of Tokyo (JP)

( * ) Notice: Subject to any disclaimer, the term of this patent is extended or adjusted under 35 U.S.C. 154(b) by 0 days.

(21) Appl. No.: 09/411,702

(22) Filed: Oct. 1, 1999

(30) Foreign Application Priority Data

Oct. 2, 1998 (JP) .................................................. 10-281678

(51) Int. Cl.$^7$ ...................................................... G02B 6/00
(52) U.S. Cl. ................................................................ 349/63
(58) Field of Search .................................. 349/63, 62, 65

(56) References Cited

U.S. PATENT DOCUMENTS

| | | | |
|---|---|---|---|
| 4,811,507 | * | 3/1989 | Blanchet ................................ 40/546 |
| 5,584,556 | * | 12/1996 | Yokoyama et al. ...................... 362/31 |
| 5,727,107 | * | 3/1998 | Umemoto et al. ..................... 385/116 |
| 6,088,074 | * | 7/2000 | Suzuki .................................... 349/62 |
| 6,108,059 | * | 8/2000 | Yang ....................................... 349/65 |
| 6,151,089 | * | 11/2000 | Yang et al. ............................ 349/113 |
| 6,196,692 | * | 3/2001 | Umemoto et al. ...................... 362/31 |
| 6,199,995 | * | 3/2001 | Umemoto et al. ...................... 362/31 |

FOREIGN PATENT DOCUMENTS 8-94844-A  *  4/1996  (JP)  .................................. G02B/6/00

\* cited by examiner

*Primary Examiner*—James A. Dudek
*Assistant Examiner*—Andrew Schechter
(74) *Attorney, Agent, or Firm*—Frishauf, Holtz, Goodman, Langer & Chick, P.C.

(57) ABSTRACT

A reflection type display having a front light comprises a light guide plate having a light incident portion to which the lights are introduced, a planar surface arranged on the surface facing said first substrate and a prismatic surface arranged on the other surface, said prismatic surface comprising pseudo-planar surfaces which are formed at an angle of approximately 0.5 to 3.5 degrees with said planar surface and are raised greater as being distanced away from said light incident portion and slanted surfaces which are formed at an angle of approximately 40 to 60 degrees with said planar surface and are descended greater as being distanced away from said light incident portion, said pseudo-planar surfaces and said slanted surfaces are arranged alternately to form multiple prisms.

9 Claims, 7 Drawing Sheets

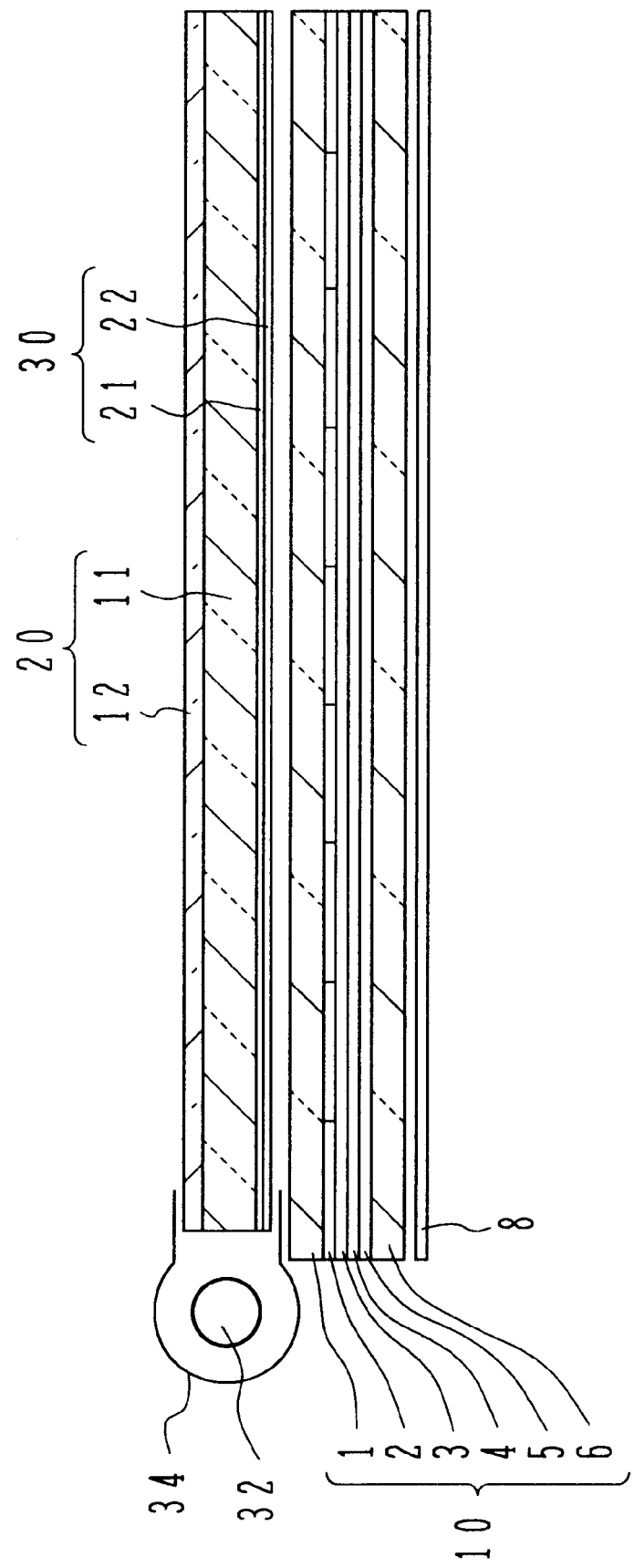

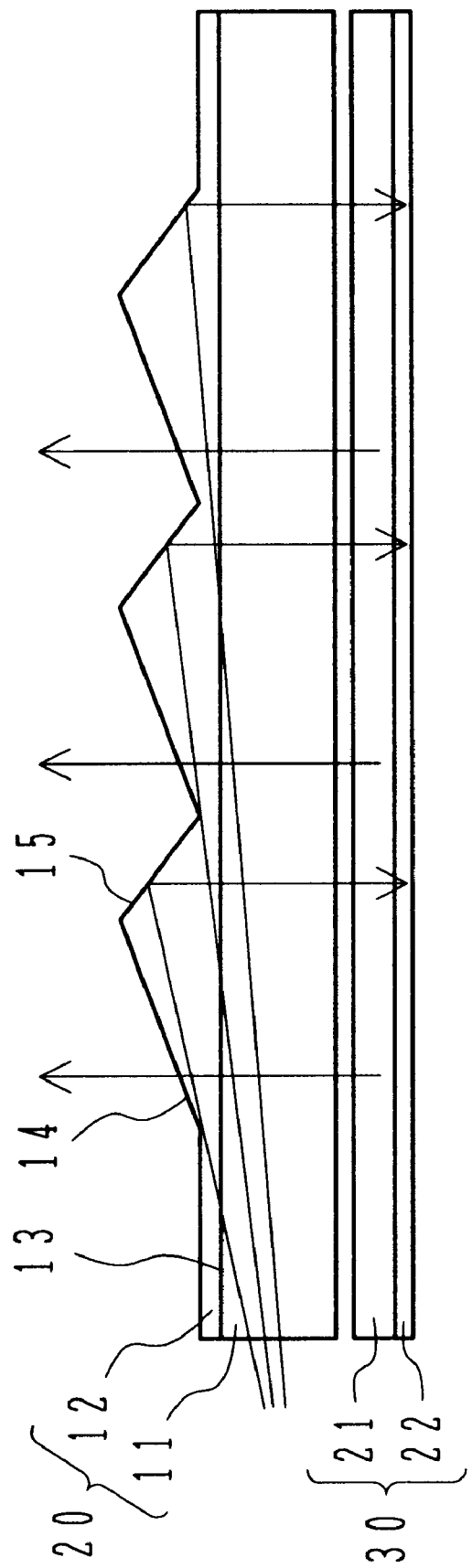

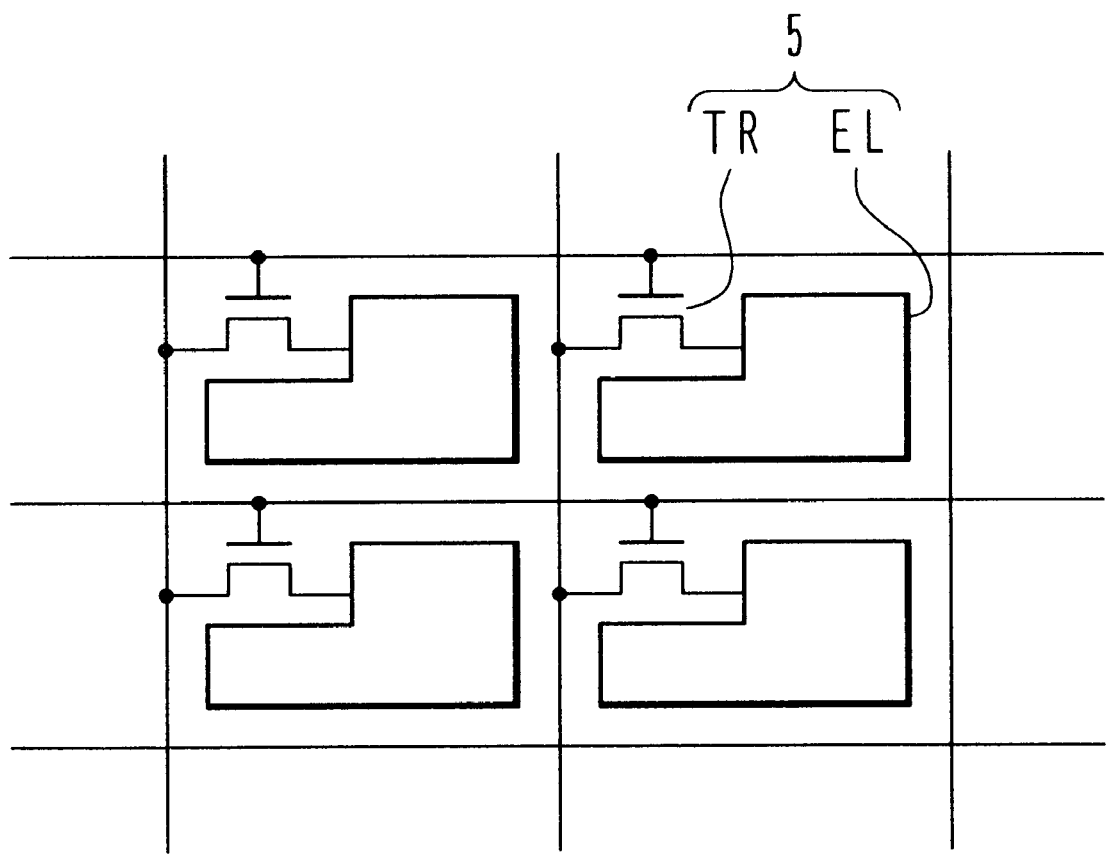

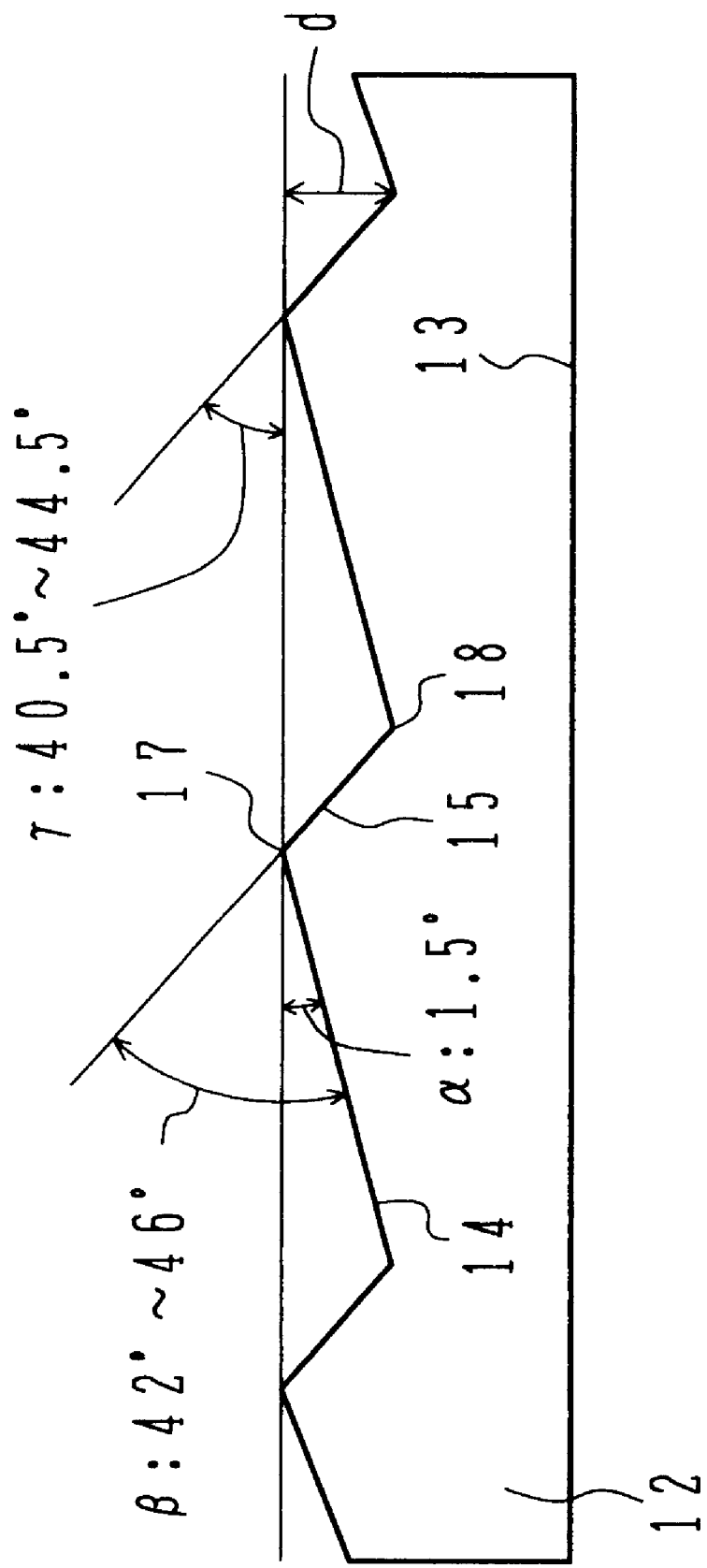

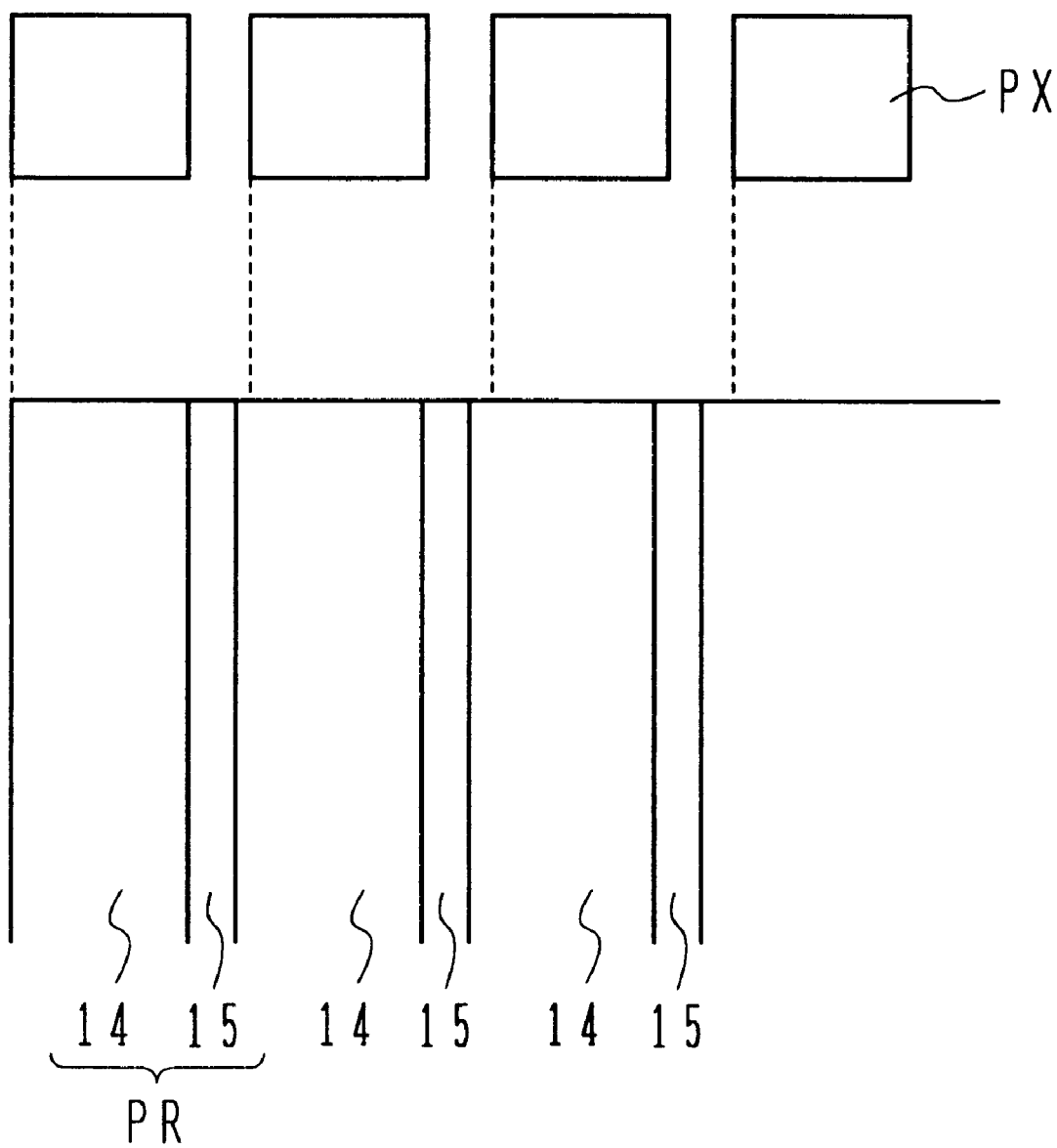

REFLECTION TYPE DISPLAY WITH FRONT LIGHT

This application is based on Japanese patent application HEI 10-281678, filed on Oct. 2, 1998, the entire contents of which are incorporated herein by reference.

BACKGROUND OF THE INVENTION a) Field of the Invention

The present invention relates to a reflection type display, and more particularly to a reflection type display with a front light.

b) Description of the Related Art

A liquid crystal display will now be described as an example of a display using electro-optical material which changes optical characteristics in accordance with electric field, however, the present invention is not limited to that.

Reflection type liquid crystal displays have been known as one type of the liquid crystal displays. A reflection type liquid crystal display is expected as a suitable display for an information terminal or the like because of low power consumption.

However, images displayed on the reflection type liquid crystal display are invisible in dark environment because the display has no light source. To overcome this disadvantage, a reflection type liquid crystal display having a front light on its viewer's side has been proposed. For example, such the reflection type liquid crystal display comprises a wedge-shaped light guide plate having a light source on its side. The light guide plate is placed on the viewer's side of the display panel. The wedge-shaped light guide plate has a planar bottom surface and a prismatic top surface comprising planar surfaces and slanted (oblique) surfaces which are arranged alternately.

The lights are introduced into the light guide plate from the light source which is placed on the side of the light guide plate. The slanted surfaces of the light guide plate reflect the introduced lights toward the liquid crystal display. A reflection plate of the liquid crystal display reflects the lights toward the viewer's eyes through the light guide plate. That is, the wedge-shaped light guide plate works as a reflector and a light transmitter.

To work as an ideal light transmitter, the planar surfaces of the prismatic top surface of the light guide plate must be almost parallel to the bottom surface. If each of the planar surfaces of the prismatic top surface is formed at a large angle with the bottom surface, the reflected lights from the liquid crystal display are refracted by the light guide plate because it works as a prism. Such the refraction influences the display quality of the liquid crystal display.

In order to reflect lateral lights in the light guide plate so as to incident upon the liquid crystal display at almost right angle, each of the slanted surfaces is required to be formed at an angle of approximately 45 degrees with the bottom surface.

The light guide plate having such the slanted surfaces and planar surfaces arranged alternately will become tapered, that is, wedge shaped. For example, the height around the light incident side of such the wedge-shaped light guide plate differs from the height around the light outgoing side, and the difference is approximately 2 to 3 mm. Such the wedge-shaped light guide plate may deteriorate the display quality of the liquid crystal display. In a case where a touch panel is disposed on the liquid crystal display, for example, a wedge-shaped gap appears between the liquid crystal display and the touch panel because of the wedge shaped light guide. This gap causes parallax.

As stated above, the reflection type liquid crystal display with the front light can be driven with low power consumption because the light source is activated only when the user needs it. However, employing the front light also brings several disadvantageous matters.

SUMMARY OF THE INVENTION

It is an object of the present invention to provide a reflection type display with a front light which has less disadvantages caused by the front light.

According to one aspect of the present invention, it is provided a reflection type display comprising a panel which comprises a first transparent substrate arranged to face external incident lights, a second substrate opposing to and coupled with said first substrate through a gap therebetween, electro-optical material retained in the gap, and electrodes formed on at least one of said first and second substrates in order to apply electric field to said electro-optical material, said electrodes forming pixels arranged repeatedly in the first direction at a first pitch; a light guide plate disposed outside of said first substrate on the light incident side, comprising a light incident portion to which the lights are introduced, and a pair of major surfaces including a planar surface facing to said first substrate and a prismatic surface on other side, said prismatic surface comprising pseudo-planar surfaces which are formed at an angle of approximately 0.5 to 3.5 degrees with said planar surface and are raised greater as being distanced away from said light incident portion and slanted surfaces which are formed at an angle of approximately 40 to 60 degrees with said planar surface and are descended greater as being distanced away from said light incident portion, said pseudo-planar surfaces and said slanted surfaces are arranged alternately to form multiple prisms arranged repeatedly at a second pitch which is different from said first pitch; and a combination of a linear polarizing plate and a quarter wavelength plate disposed on said planar surface of said light guide plate.

Modifying the shape of the light guide plate can reduce disadvantageous matters caused by employing the front light.

The top surface of the light guide plate is prismatic. The prismatic surface comprises the pseudo-planar surfaces and the slanted surfaces which are arranged alternately. The pseudo-planar surfaces are raised greater as being distanced away from the light source. The slanted surfaces are descended greater as being distanced away from the light source. Thus, the heights of the apex lines of the prisms are almost uniformed, and the completed light guide plate has a pseudo-planar shape.

To obtain uniform brightness from the light guide plate, the reflection rate of the prisms should be increased as being distanced away from the light source. This adjustment is accomplished by adjusting depths of the prisms (that is, the difference between the apex line of the prism and the bottom line of the prism).

BRIEF DESCRIPTION OF THE DRAWINGS

FIGS. 1A, 1B and 1C are schematic cross sectional views and a schematic partial plan view of an active matrix substrate showing the structure of a reflection type liquid crystal display according to an embodiment of the present invention.

FIG. 2 is an enlarged sectional view showing a prism unit.

FIG. 5 is a plan view schematically showing the location of pixels and the prism for explaining the relationship between the pixel and the prism pitch.

DETAILED DESCRIPTION OF THE PREFERRED EMBODIMENT

Figure 3:
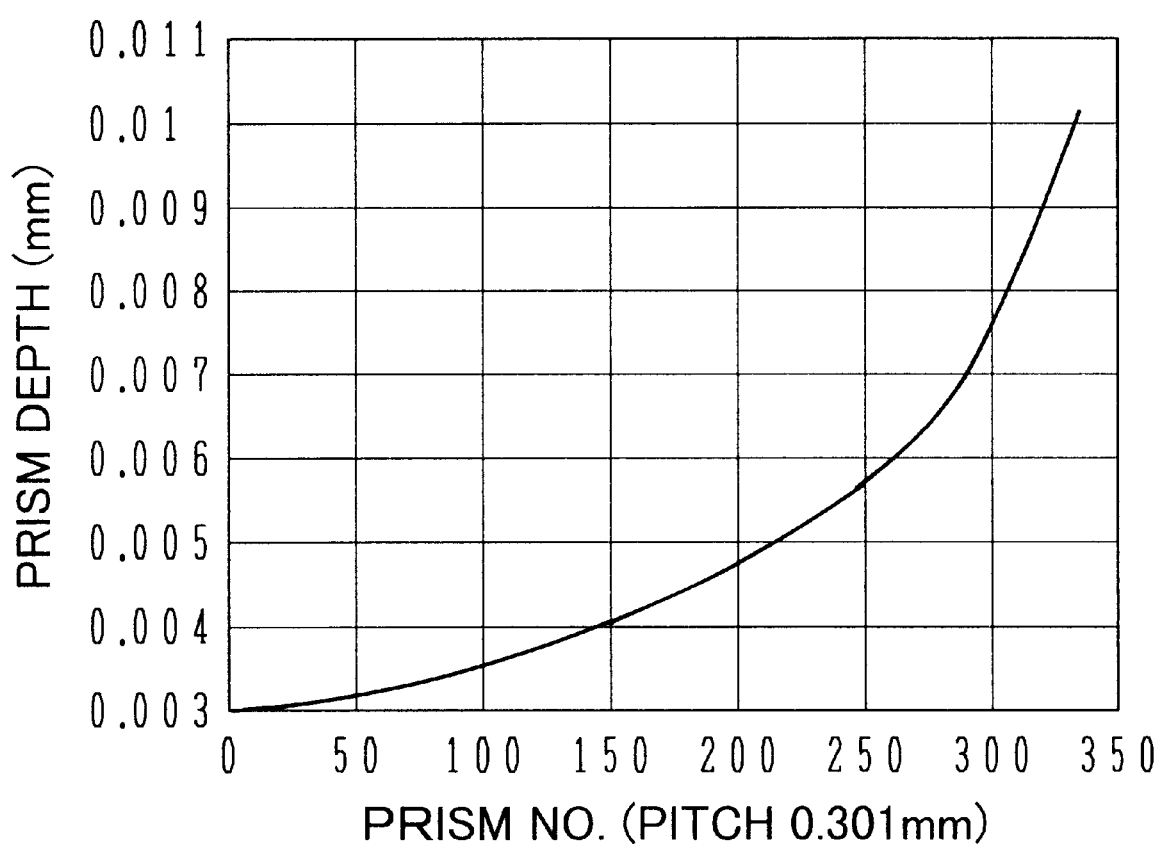
FIG. 3 is a graph showing the variation of the prism depth.

FIGS. 1A and 1B are cross sectional views showing the structure of a reflection type liquid crystal display according to an embodiment of the present invention. FIG. 1A is a cross sectional view showing the structure of the reflection type liquid crystal display in whole. FIG. 1B is an enlarged sectional view showing the structure of a light guide plate in the reflection type liquid crystal display in detail.

In FIG. 1A, a liquid crystal panel comprises a pair of glass substrates 1 and 6 sandwiching a liquid crystal 4. A color filter layer 2 and a transparent electrode layer 3 are formed on the opposing (inner) surface of the glass substrate 1, and pixels 5 are formed on the opposing surface of the glass substrate 6. As shown in FIG. 1C, active matrix elements, each comprising, for example, an insulated gate transistor TR and a pixel electrode EL, form the pixels 5. A reflection panel 8 is placed beneath the liquid crystal panel 10.

The reflection panel 8 may be formed in the liquid crystal panel 10. For example, the reflection panel 8 may. be placed beneath the pixels 5 or on the outer surface of the glass substrate 6.

As shown in leftward of FIG. 1A, a light source 32 and a reflector 34 are arranged. The light source 32 comprises a cold-cathode tube. The reflector 34 reflects lights from the light source 32 toward a light guide plate 20. The lights reflected by the reflector 34 are introduced into the light guide plate from its left end.

The light guide plate 20 and a polarization controller 30 are placed above the liquid crystal panel 10. The purpose of the polarization controller 30 is to block the reflected lights. The light guide plate 20 comprises a transparent acrylic plate and a prism unit 12. The acrylic plate 11 has two major surfaces which are parallel to each other. The prism unit 12 is formed on one of the major surfaces of the acrylic plate 11 with ultraviolet curing resin. The prism unit 12 comprises a planar bottom surface 13 and a top surface comprising pseudo-planar surfaces 14 and slanted (oblique) surfaces 15. The farther the pseudo-planar surfaces 14 are distanced away from the light source 34, the greater they are raised, while the farther the slanted surfaces 15 are distanced away from the light source 34, the greater they are descended. FIG. 1B schematically shows the structure of the light guide plate 20 in detail.

The polarization controller 30 includes a lamination of a linear polarizer 21 and a quarter wavelength plate (λ/4 plate) 22. The linear polarizer 21 forms linearly polarized lights including x-component and y-component each having the same strength. The quarter wavelength plate 22 provides retardation of quarter wavelength to one of the x-component or the y-component. As a result, outgoing lights from the polarization controller 30 are circularly polarized lights.

The outgoing lights from the polarization controller 30 are reflected by the reflector 8 placed below the polarization controller 30, and the reflected lights return to the polarization controller 30. The quarter wavelength plate 22 further gives retardation of quarter wavelength, resulting in that the polarization axes of the returned lights are 90 degrees different from those of the incident linearly polarized lights, if the returned lights keep their polarization condition in the liquid crystal layer. Then, the linear polarizer 21 blocks such the reflected lights. In other words, the polarization controller 30 outputs the lights toward the reflector 8 below, and blocks the mirror-reflected lights from the reflector 8, thus, the mirror-reflected lights do not reach the light guide plate 20. When the liquid crystal layer changes the polarization state of the incident lights, the linear polarizer 21 allows passage of the lights depending on how far the polarization state is changed.

In FIG. 1B, the slanted surfaces 15 reflect lateral lights traveling from left to right in the light guide plate 20, thus the lights turn downward. In FIG. 1B, since each of the slanted surfaces 15 is formed at an angle of approximately 45 degrees with a horizontal plane (that is, slanted), the lateral lights from left to right which are almost horizontal are reflected so as to be perpendicular to the liquid crystal display. And the reflected lights are incident upon the liquid crystal display. The angle of the slanted surfaces 15 is selected from the range of approximately 40 to 60 degrees because the lights from the light source 32 are not completely horizontal.

The lights from the slanted surfaces 15 passes through the liquid crystal panel 10, and are reflected by the reflection plate 8. The reflected lights ascend toward the polarization controller 30 and the light guide plate 20. Of the light guide plate 20, the pseudo-planar surfaces 14 which are almost horizontal constitute the exit surfaces. The incident lights upon the slanted surfaces 15 are reflected almost completely toward the inside of the light guide plate 20 because each of the incident angles is large.

It is desired that uniform brightness is obtained from the light guide plate 20 in order to gain higher display performance. The light source 32 lays along one side of the light guide plate 20, thus, the lights from the light source 32 pass through the light guide plate 20 from left to right. If the prism unit 12 on the light guide plate 20 has uniformed prismatic shape, the quantity of the lights reflected from the prisms becomes small as the prisms being distanced from the light source 32, because the solid angle of the prism becomes smaller. Accordingly, the uniformed prisms are not suitable for obtaining the uniform brightness from the light guide plate 20.

FIG. 2 is an enlarged sectional view showing the prism unit 12 on the light guide plate 20 in detail. The prism unit 12 has a planar and flat bottom surface, and a top surface comprising the pseudo-planar surfaces 14 and the slanted surfaces 15 which are arranged alternately. Borders between the pseudo-planar surfaces 14 and the slanted surfaces 15 form apex lines 17 and bottom lines 18. To transmit the outgoing lights to the viewer without deterioration as possible, each of the pseudo-planar surfaces 14 should not be formed at a large angle with the planar bottom surface 13. That is, each of the pseudo-planar surfaces 14 is required to be almost parallel to the bottom surface 13.

However, if the pseudo-planar surfaces 14 are formed so as to be parallel to the bottom surface 13, the prism unit 12 on which the prisms are formed should be tapered to the left side. In this case, the light guide plate 20 looks like a wedge. Such the wedge-shaped light guide plate causes several disadvantageous matters.

To overcome such the disadvantages, the pseudo-planar surfaces 14 should be formed so as to be gradually raised greater as being distanced away from the light source 32 while being almost parallel to the bottom surface 13. For example, each of the pseudo-planar surfaces 14 is formed at an angle of approximately 1.5 degrees with a horizontal plane. The slanted surfaces 15 reflect the lateral lights traveling from left to right in the light guide plate 20 toward the reflection type liquid crystal display.

The quantities of the incident lights upon the prisms per unit area are not uniform. That is, the quantities of the incident lights gradually decrease from left to right. To obtain uniformity of the quantities of the lights, it is desired that the slanted surfaces 15 are formed so as to become gradually wider from left to right. A preferred method for enlarging the slanted surfaces 15 is to form the pseudo-planar surfaces 14 and the slanted surfaces 15 in such a manner that the difference d between the apex line 17 and the bottom line 18 (hereinafter referred to as depth) gradually increases from left to right.

The average angle of the incident lights upon the slanted surfaces 15 gradually decrease from left to right. Therefore, an angle γ between the slanted surface 15 and a horizontal plane may be varied. For example, the angle γ may be varied from approximately 40.5 to 44.5 degrees. An angle β which is the sum of an angle α between the pseudo-planar surface 14 and a the horizontal plane, and the angle γ between the slanted surface 15 and the horizontal plane varies from approximately 42.5 to 46 degrees. The direction of the lights toward the liquid crystal panel 10 from the slanted surfaces 15 is preferably slightly (for example, approximately ±5 degrees) different from the vertical direction in order to accomplish brighter and high contrast display.

The prism pitch should be in the range of 100 to 500 microns, more particularly in the range of 200 to 300 microns. The preferred depth d of the prism is in the range of 1 to 15 microns. The depth d of the prisms should be adjusted so that when lights of uniform intensity are incident and reflected by the slanted surfaces, the strength of the outgoing lights from the farthest point on the planar surface from the light incident point is 1.3 to 2 times as greater as that of the outgoing lights from the closest point on the planar surface to the light incident point.

Whole of the light guide plate 20 may be formed with transparent material such as acrylic resin, however, the prism unit 12 is preferably formed with a material having a higher plasticity in order to form the prismatic shape. When the prism unit 12 is formed with a combination of an ultraviolet curing resin and the acrylic plate, the prism unit 12 may be formed easily by using a stamper or the like.

FIG. 3 is a graph showing the variation of the prism depth when the prisms are numbered from left to right. As shown in the graph, the prism depth varies exponentially from approximately 3 to 10 microns. It becomes easy to obtain uniform brightness from the light guide plate by varying the prism depths in this way.

Figure 4:
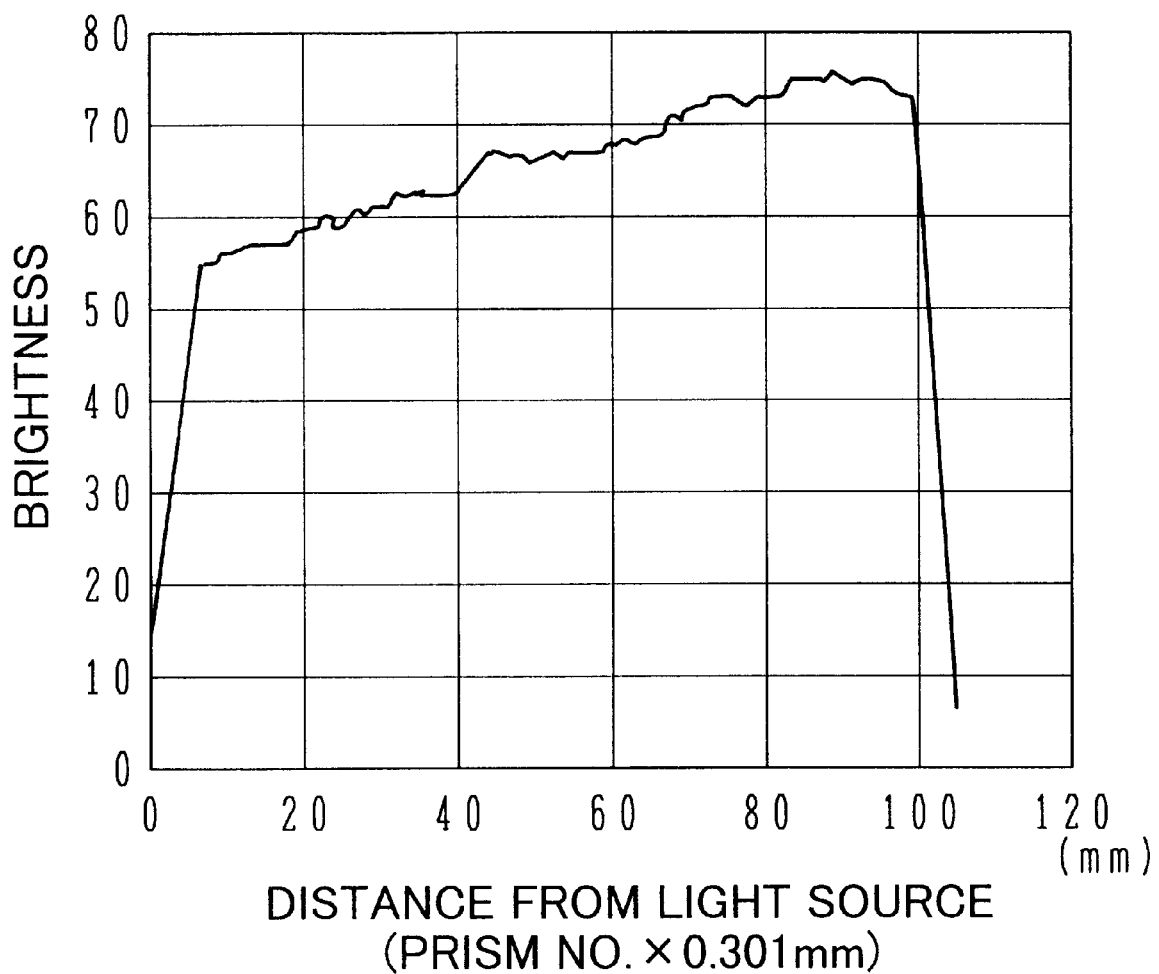
FIG. 4 is a graph showing the variation of the reflection rate of the prism.

FIG. 4 is a graph showing the reflection rate of each prism of the light guide plate wherein the prism depths are gradually varied. The reflection rate increase almost linearly from left to right. The increase of the reflection rate of the prism compensate the decrease of the intensity of the incident lights. As a result, lights output from the light guide plate can have uniform brightness.

The light guide plate on the reflection type liquid crystal display may cause moire fringe. The linear polarizer and the quarter wavelength plate under the light guide plate may reduce the moire by blocking the reflected lights from the liquid crystal panel. However, the moire may still appear even if the linear polarizer and the quarter wavelength plate are provided. To reduce the moire more completely, the arrangement of the pixels and the prisms can be adjusted.

FIG. 5 is a plan view schematically showing the relationship between the pixel pitch and the prism pitch. Each of the pixels PX is a square whose side is 150 to 360 microns. The pixels PX are arranged at intervals of 10 to 20 microns. The prisms PR comprise the pseudo-planar surfaces 14 and the slanted surfaces 15 which are arranged so that the prism pitch slightly differs from the pixel pitch.

Because of the slight difference between the pitch of the pixels PX and the pitch of the prisms PR, relative location (phase) between the pixels PX and the prisms PR gradually varies. Since the pitches are only slightly different from each other, cyclic appearance of the same phase relation is reduced. If the distances between adjacent points of the same phase relation between the pixel PX and the prism PR is long enough relative to the display area, the moire can be effectively prevented from appearing, by avoiding the appearance of a cyclic structure.

To accomplish the above described relationship for preventing the moire, it is enough to select the pitches so that the lowest common multiple of the pitches becomes enough large. Arranging the pixels PX and the prisms PR so that their pitches slightly differ from each other is effective in obtaining such the large lowest common multiple. The area based on the distance between adjacent points of the same phase is desired to be equal to or larger than approximately ⅔ of the display area for better moire prevention.

The present invention has been explained with reference to the above embodiment, however, the present invention is not limited to the above embodiment. The present invention may employ any reflection type display. For example, a reflective type display using a photograph instead of the liquid crystal display may be used. The material for the light guide plate is not limited to the acrylic resin and the ultraviolet curing resin. In a case where the transparent plate and the prism unit are formed with different materials, the transparent plate is preferably formed with a material having enough strength, and the prism unit is preferably formed with a material having well plasticity. It will be apparent that various modifications, combinations, etc. are possible to those skilled in the art.

What is claimed is:

1. A reflection type display comprising:

a panel with a display area which comprises a first transparent substrate arranged to face external incident lights, a second substrate opposing to and coupled with said first substrate through a gap therebetween, electro-optical material retained in the gap, and electrodes formed on at least one of said first and second substrates in order to apply electric field to said electro-optical material, wherein said electrodes form pixels arranged repeatedly in the first direction with a first pitch;

a light guide plate disposed outside of said first substrate on the light incident side, comprising a light incident portion to which the lights are introduced, and a pair of major surfaces including a planar surface facing to said first substrate and a prismatic surface on other side, said prismatic surface comprising pseudo-planar surfaces which are formed at an angle of approximately 0.5 to 3.5 degrees with said planar surface and which are raised greater as being distanced away from said light incident portion and slanted surfaces which are formed at an angle of approximately 40 to 60 degrees with said planar surface and which are descended greater as being distanced away from said light incident portion, and wherein said pseudo-planar surfaces and said slanted surfaces are arranged alternately to form multiple prisms arranged repeatedly at a second pitch which is different from said first pitch; and a combination of a linear polarizing plate and a quarter wavelength plate disposed on said planar surface of said light guide plate.

2. The reflection type display according to claim 1, wherein said light guide plate comprises a transparent substrate which has a pair of surfaces which are parallel to each other and a plastic layer formed on said transparent substrate, said pseudo-planar surfaces and said slanted surfaces are formed on a surface of said plastic layer, and intersections of each pair of said slanted surface and adjacent pseudo-planar surface on side of said light incident portion form apex lines of the prisms whose heights from the surface of said transparent substrate are almost uniform as a whole.

3. The reflection type display according to claim 1, wherein intersections of each pair of said pseudo-planar surface and adjacent slanted surface on side of said light incident portion form bottom lines of the prisms whose depths from the apex lines become deeper as the bottom line is distanced away from said light incident portion.

4. The reflection type display according to claim 3, wherein the depths are so set that the strength of the lights reflected by said slanted surfaces and outgoing perpendicularly from said planar surface, at the farthest point of said planar surface from said light incident point is 1.3 to twice as large as that of the lights at the closest point on said planar surface from said light incident point.

5. The reflection type display according to claim 3, wherein the depths increase exponentially with respect to the distance from said light incident point.

6. The reflection type display according to claim 3, wherein the depth is in the range of 1 to 13 microns.

7. The reflection type display according to claim 1, wherein the pitch of said multiple prisms is in the range of 100 to 500 microns.

8. The reflection type display according to claim 3, wherein the pitch of said multiple prisms is in the range of 100 to 500 microns.

9. The reflection type display according to claim 1, wherein an area between adjacent positions of same phase relation of the prism with the pixel is at least about 2/13 of the display area.

* * * * *